UNITED STATES PATENT OFFICE.

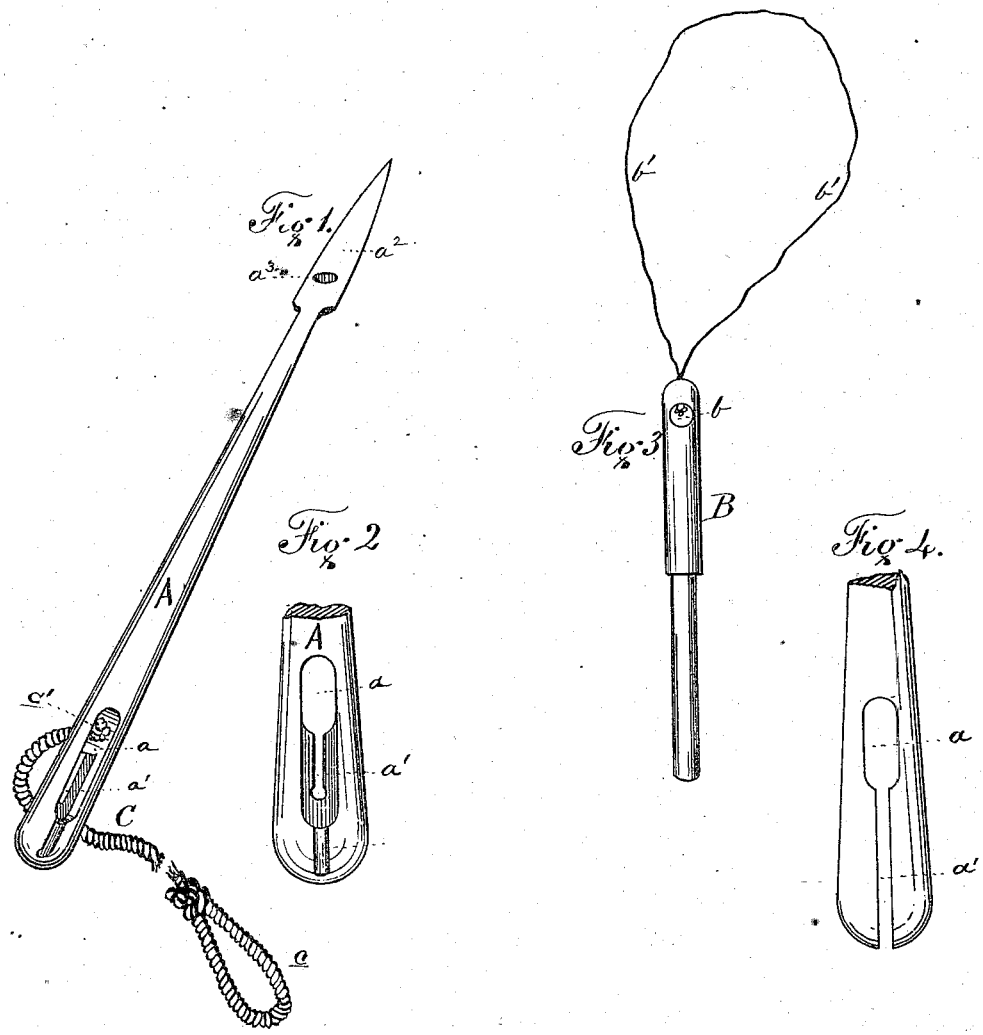

WILLIAM A. PATTERSON, OF JUNIATA COUNTY, PENNSYLVANIA.

IMPROVEMENT IN IMPLEMENTS FOR BINDING GRAIN.

Specification forming part of Letters Patent No. 160,705, dated March 9, 1875; application filed November 5, 1874.

*To all whom it may concern:*

Be it known that I, WILLIAM A. PATTERSON, of Juniata county and State of Pennsylvania, have invented certain new and useful Improvements in Hand Binding and Baling Machine; and I do hereby declare the following to be a full, clear, and exact description of the invention, such as will enable others skilled in the art to which it pertains to make and use it, reference being had to the accompanying drawings, which form part of this specification.

The object of my invention is to facilitate the binding of sheaves of grain, and similar farm products, and the tying of bundles or bales, in all cases where cord is used, by shortening the operation, lessening the labor, and cheapening the cost, leaving the sheaf, bundle, or bale securely bound or tied.

My invention consists in the construction of a lever and pin, the formation and operation of which will be more fully described hereafter.

In the drawing forming a part of this specification, Figure 1 is a view of the lever and cord, showing the manner of their attachment. Fig. 2 is a detached view of the lever, showing the manner of forming the mortise and slot. Fig. 3 is a view of the pin and pin-cord attached. Fig. 4 is a view of a modification of the manner of forming the mortise and slot.

Like letters refer to like parts.

A is the lever, having a mortise, $a$, and slot $a^1$ in the end, as shown in Figs. 1, 2, and 4. An extension of the mortise on both sides of the slot forms a shoulder, as shown in Figs. 1 and 2, which prevents the knotted end of the cord from being drawn out. The head $a^2$ of the lever is formed as shown in Fig. 1, having a shoulder to prevent the slipping of the loop end of the binding-cord. In the head $a^2$ is a hole, $a^3$, for the insertion of the pin B. I prefer to make the lever for binding fodder about fifteen inches in length. The pin B is formed as shown in Fig. 3, having a small cord, $b'$, inserted and secured in the hole $b$ of the head of the pin.

The pin I prefer to make of wood, and about six inches in length, and of proper size to fit the hole in the head of the lever. The cord $b'$ is passed around the wrist to prevent dropping the pin, when it is desired to have the hand free.

The binding-cord C (shown in Fig. 1) is made of good strong wrapping-cord or twine, which I prefer to have thoroughly tarred, and about forty-two (42) inches in length, for binding sheaves of fodder and similar products.

The cord is prepared for use as follows: First, tie a secure knot in each end. Then form a loop on one end by passing the cord around the first three fingers, and tying it securely below the knot on the end.

The operation of binding, tying, or baling is as follows: Take the pin B and secure it to the wrist by the cord $b'$ attached thereto. Then take the lever A and insert the knotted end $c'$ of the cord $c$ into the mortise $a$, and pass it along the slot $a^1$ until the knot rests on the shoulder formed by the slot and mortise, which will prevent it from slipping out. Then take the pin B and put it through the loop $c$ of the cord C, and draw the cord down between the first and second fingers of the right hand. Then take the lever A into the same hand, holding it by the mortise end, and pass it under the sheaf, bundle, or bale, and grasp it by the head with the left hand, and pull it through and draw the cord C over by the right hand, and pass the loop $c$ over the head of the lever, and downward, until it is secured by the shoulder formed on the head. Draw the pin B, and insert it in the hole $a^3$, and place the foot on the cord C near the lever, and draw the lever through the loop until the mortise end is clear; then reverse the motion of the lever, which will release the knotted end $c'$ of the cord C, which will be caught and held by the loop end $c$, leaving the sheaf, bundle, or bale securely tied.

The lever A may be made of malleable cast-iron or wood. When made of iron the casting may be constructed with the slot $a^1$ extending entirely out to the end, as shown in Fig. 4. In that case the knot $c'$ will rest on the shoulders formed in the mortise, where the same unites with the slot, which will prevent it being drawn out. The knot is released in the same manner as before described.

Having thus fully described my invention, I claim as new and desire to secure by Letters Patent—

1. The lever A, having mortise $a$ and slot $a^1$, and head $a^2$, and pin-hole $a^3$, as and for the purpose described and shown.

2. The lever A, in combination with the pin B, which has the hole $b$ in the head, and looped cord $b'$, secured in the hole, as and for the purpose described and shown.

In testimony that I claim the foregoing I have hereunto set my hand this 4th day of November, 1874.

WILLIAM A. PATTERSON.

Witnesses:
E. C. WEAVER,
ROBERT A. PATTERSON.